March 5, 1968          J. R. TURNER          3,371,488

SEGMENTED ROCKET MOTOR

Filed Feb. 23, 1966

*INVENTOR.*
JAMES R. TURNER

BY Edwin D. Grant

ATTORNEY 3,371,488
SEGMENTED ROCKET MOTOR
James R. Turner, Ogden, Utah, assignor to Thiokol Chemical Corporation, Bristol, Pa., a corporation of Delaware
Filed Feb. 23, 1966, Ser. No. 529,497
3 Claims. (Cl. 60—200)

This invention relates to rocket motors and more particularly to a segmented rocket motor the components of which are locked together by lightweight connecting means.

Briefly described, a rocket motor constructed in accordance with the principles of this invention comprises a tubular casing formed of a plurality of cylindrical segments arranged tandem and having an end closure at each end thereof, said segments and end closures being secured together by means of high-strength cables. As will become clear in the following specification, the end closures and casing segments of a preferred embodiment of the invention can be separately transported to a firing site and thereafter quickly and conveniently joined to form a rocket motor.

It is accordingly a broad object of this invention to provide a segmented rocket motor the components of which can be assembled quickly and conveniently.

Another object of the invention is to provide a segmented rocket motor the components of which are joined together by lightweight cables.

Figure 1:
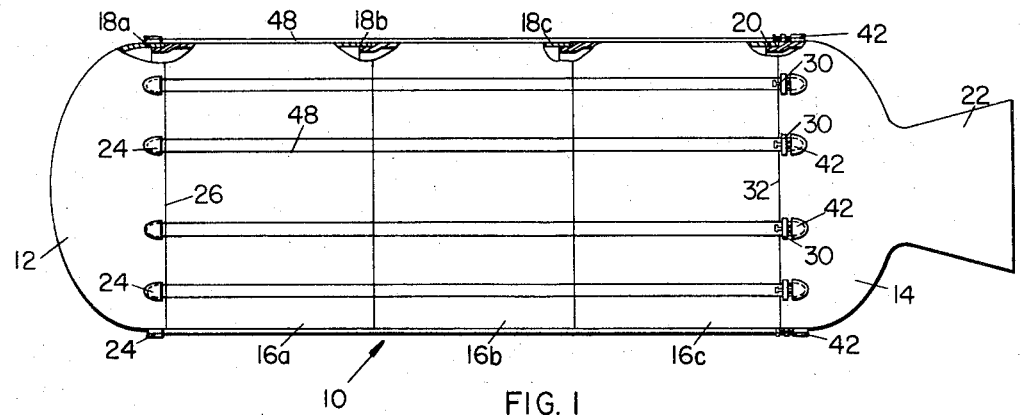
Figure 2:
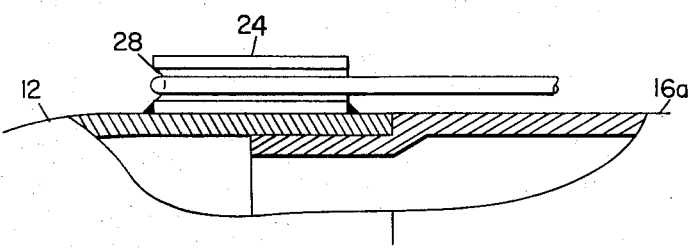
Figure 3:
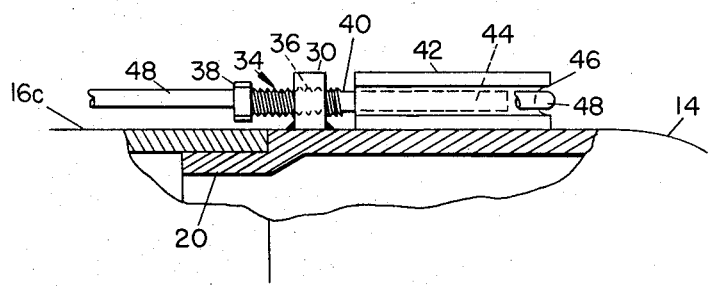

Other objects and advantages of the invention will appear in the following description of a preferred embodiment thereof, in which reference is made to the accompanying drawings wherein:

FIGURE 1 is a view illustrating said embodiment, portions of the end closures and casing segments thereof being removed in the drawing for clarity; and FIGURES 2 and 3 are detail views of components of said embodiment.

Throughout the specification and drawings the same reference numbers refer to the same parts.

In FIGURE 1 reference number 10 generally designates a tubular rocket motor casing having a forward end closure 12 and aft end closure 14 connected thereto. More particularly, casing 10 is formed of three hollow, cylindrical casing segments 16a, 16b, 16c, arranged tandem, the forward edge of each of said casing segments being formed with an offset, circumferentially extending portion 18a, 18b, 18c that is, in the case of casing segments 16b and 16c, slidably engaged within the aft end of the casing segment forward thereof, and, in the case of casing segment 16a, slidably engaged within forward end closure 12. Aft end closure 14 is also formed with an offset, circumferentially extending portion 20 that is slidably engaged within the aft end of casing segment 16c, and a thrust nozzle 22 is fixedly mounted on said aft end closure.

Forward end closure 12 is provided with a plurality of elongated first support lugs 24 that are fixedly mounted on the exterior surface thereof, as by means of welding. Support lugs 24 are spaced circumferentially of forward end closure 12 and equidistant from the peripheral edge 26 thereof. As illustrated in FIGURES 1 and 2, each support lug 24 is rounded at its forward end and has a continuous groove 28 formed in the forward and side edges thereof. In FIGURE 1 it can also be seen that each of a plurality of support plates 30 is mounted on aft end closure 14 in longitudinal alignment with one of the support lugs 24 on forward end closure 12. Support plates 30 are thus spaced circumferentially of aft end closure 14 and equal in number to support lugs 24. More particularly, each support plate 30 is fixedly attached to the exterior surface of aft end closure 14, as by means of welding, is equidistant from the peripheral edge 32 of said aft end closure, and is disposed perpendicular to the longitudinal axis of casing 10.

As illustrated in FIGURE 3, a screw, generally designated by reference number 34, is threadedly engaged within an aperture 36 in each support plate 30, said screw having an integral head 38 and including an unthreaded end portion 40 of reduced diameter. Apertures 36 are formed in support plates 30 so that the longitudinal axis of each screw 34 is parallel to the longitudinal axis of casing 10. In the same drawing is illustrated a typical one of a plurality of elongated second support lugs 42 each of which is mounted on one of the screws 34. More specifically, each support lug 42 is rounded at its forward end, is provided with a hole 44 in which the end portion 40 of one of said screws is slidably disposed, and has a continuous groove 46 formed in the aft and side edges thereof. Each support lug 42 slidably abuts aft end closure 14. A wire cable 48, fabricated in an endless loop, is attached to each of the first support lugs 24 and to one of the second support lugs 42, the cable being positioned in the grooves 28, 46 respectively formed in said lugs. These cables 48 are preferably formed of high-strength steel. The other components of the embodiment are also made of steel or other suitable metals. In the preferred embodiment of the invention herein described and illustrated, a solid propellant charge (not shown) is fixedly held within each of the casing segments 16a, 16b, 16c and within forward end closure 12.

It will be recognized that the casing segments 16a, 16b, 16c and end closures 12, 14 can be conveniently transported in disassembly to a firing site and thereafter assembled by simply arranging said segments tandem, placing end closures 12, 14 on the ends of the casing 10 thereby formed, looping cables 48 over respective ones of the support lugs 24, 42, and then turning screws 34 so as to move each of said support lugs 42 toward thrust nozzle 22 and thereby place cables 48 under tension. The casing segments and end closures are thus securely locked together, and the rocket motor is ready to be fired. Hence the invention provides a segmented rocket motor the components of which can be joined in a much shorter time than is required with conventional segmented rocket motors the components of which are bolted together.

It will also be recognized that the number of casing segments 16 of a rocket motor constructed in accordance with the principles of this invention can be more or fewer than the three utilized in the disclosed embodiment, and that cables 48 of different lengths can readily be provided for use with longer or shorter rocket motors. Hence the invention provides an arrangement whereby rocket motors of different sizes can be conveniently assembled.

Various modifications of the embodiment of the invention herein presented will be obvious to persons skilled in the art of rocket motors. For example, the cable loops 48 utilized in the illustrated preferred embodiment can be replaced with a plurality of single cables each having terminal eyes or loops that can be attached to one of the support lugs 24 and to one of the support lugs 42 respectively. The cables 48 can obviously also be attached to support lugs 24 and support lugs 42 that are displaced relative to one another circumferentially of casing 10. If desired, a lock nut can be provided on each screw 34 for preventing its rotation after the support lug 42 mounted thereto has been positioned, or a set screw can be mounted on each support plate 28 for the same purpose. Since other modifications and changes of similar nature can be made in the embodiment of the invention that has been described without departing from the concepts on which it is based, the scope of the invention is to be considered as limited only by the terms of the appended claims.

What is claimed is:

1. A rocket motor comprising a tubular casing, a forward end closure the peripheral edge of which matingly abuts one end of said casing, an aft end closure the peripheral edge of which matingly abuts the other end of said casing, said aft end closure having at least one thrust nozzle mounted thereon, a plurality of first support lugs fixedly mounted on the exterior surface of one of said end closures and spaced circumferentially thereof, a plurality of screws rotatably mounted on the exterior surface of the other of said end closures and spaced circumferentially thereof, a plurality of second support lugs respectively mounted on said screws, and a plurality of cables each attached to one of said first support lugs and to one of said second support lugs, whereby said screws can be turned to move said second support lugs away from said first support lugs to thereby secure said end closures fixedly to said casing.

2. A rocket motor as defined in claim 1 wherein said casing comprises a plurality of casing segments arranged tandem.

3. A rocket motor comprising a tubular casing formed of a plurality of casing segments arranged tandem, a forward end closure the peripheral edge of which matingly abuts one end of said casing, an aft end closure the peripheral edge of which matingly abuts the other end of said casing, said aft end closure having at least one thrust nozzle mounted thereon, a plurality of first support lugs fixedly mounted on the exterior surface of one of said end closures and spaced circumferentially thereof, a plurality of support plates fixedly projecting from the exterior surface of the other of said end closures and spaced circumferentially thereof, a plurality of screws respectively threadedly engaged with said support plates and disposed substantially parallel to the longitudinal axis of said casing, a plurality of second support lugs respectively mounted on said screws, and a plurality of cable loops each attached to one of said first support lugs and to one of said second support lugs, whereby said screws can be turned to move said second support lugs away from said first support lugs to thereby secure said end closures and said casing segments fixedly together.

References Cited

UNITED STATES PATENTS

| | | | |
|---|---|---|---|
| 3,074,584 | 1/1963 | Dobell | 220—3 |
| 3,133,659 | 5/1964 | Dobell et al. | 220—3 |

FOREIGN PATENTS

| | | |
|---|---|---|
| 673,040 | 9/1929 | France. |

CARLTON R. CROYLE, *Primary Examiner.*